United States Patent
Chen et al.

(10) Patent No.: US 12,328,771 B2
(45) Date of Patent: *Jun. 10, 2025

(54) SYSTEM INFORMATION TRANSMISSION METHOD, TERMINAL AND NETWORK DEVICE

(71) Applicant: VIVO MOBILE COMMUNICATION CO., LTD., Guangdong (CN)

(72) Inventors: Li Chen, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,868

(22) Filed: Feb. 12, 2024

(65) Prior Publication Data

US 2024/0251447 A1 Jul. 25, 2024

Related U.S. Application Data

(63) Continuation of application No. 17/814,563, filed on Jul. 25, 2022, now Pat. No. 11,937,306, which is a (Continued)

(30) Foreign Application Priority Data

Jun. 14, 2017 (CN) .......................... 201710454492.5

(51) Int. Cl.
*H04W 74/0833* (2024.01)
*H04L 5/00* (2006.01)
(Continued)

(52) U.S. Cl.
CPC ....... *H04W 74/0833* (2013.01); *H04L 5/0055* (2013.01); *H04W 48/12* (2013.01); *H04W 74/006* (2013.01)

(58) Field of Classification Search
CPC ............. H04W 74/0833; H04W 48/12; H04W 74/006; H04L 5/0055
See application file for complete search history.

(56) References Cited

U.S. PATENT DOCUMENTS 10,660,124 B2 * 5/2020 Kim ....................... H04W 74/00
10,764,929 B2 * 9/2020 Kim ..................... H04W 74/002
(Continued)

FOREIGN PATENT DOCUMENTS

CN 102238754 A 11/2011
CN 103052167 A 4/2013
(Continued)

OTHER PUBLICATIONS

First Office Action for Chinese Application No. 202011296137.8, dated Nov. 4, 2022, 10 Pages.
(Continued)

Primary Examiner — Michael J Moore, Jr.
(74) Attorney, Agent, or Firm — BROOKS KUSHMAN P.C.

(57) ABSTRACT

A system information transmission method, a terminal and a network device are provided. The method includes: receiving request information for requesting target Other System Information sent by a terminal; configuring a random access message 2 or a random access message 4 for the terminal based on the request information; and sending the random access message 2 or the random access message 4 to the terminal.

20 Claims, 4 Drawing Sheets

Related U.S. Application Data continuation of application No. 16/623,389, filed as application No. PCT/CN2018/090788 on Jun. 12, 2018, now Pat. No. 11,432,331.

(51) Int. Cl.
*H04W 48/12* (2009.01)
*H04W 74/00* (2009.01)

(56) References Cited

U.S. PATENT DOCUMENTS

| | | | |
|---|---|---|---|
| 11,432,331 B2* | 8/2022 | Chen | H04W 52/0212 |
| 11,937,306 B2* | 3/2024 | Chen | H04W 74/00 |
| 2015/0326995 A1 | 11/2015 | Li et al. | |
| 2016/0234735 A1* | 8/2016 | Kubota | H04W 48/14 |
| 2016/0234736 A1* | 8/2016 | Kubota | H04W 48/12 |
| 2016/0234759 A1* | 8/2016 | Kubota | H04W 48/14 |
| 2016/0345311 A1 | 11/2016 | Chen et al. | |
| 2017/0290064 A1 | 10/2017 | Liu et al. | |
| 2018/0049107 A1* | 2/2018 | Johansson | H04W 48/14 |
| 2018/0199266 A1 | 7/2018 | Pantelidou | |
| 2018/0199267 A1* | 7/2018 | Lin | H04W 48/14 |
| 2018/0249508 A1 | 8/2018 | Gao et al. | |
| 2018/0270866 A1* | 9/2018 | Loehr | H04L 1/188 |
| 2018/0270868 A1* | 9/2018 | Ou | H04W 74/004 |
| 2018/0279377 A1* | 9/2018 | Lin | H04W 88/023 |
| 2018/0288676 A1* | 10/2018 | Wei | H04L 63/101 |
| 2018/0302843 A1* | 10/2018 | Frenger | H04W 48/10 |
| 2019/0166622 A1* | 5/2019 | Kim | H04W 74/00 |
| 2020/0008223 A1* | 1/2020 | Yang | H04W 72/1268 |
| 2020/0178305 A1* | 6/2020 | Chen | H04L 5/0055 |
| 2020/0236681 A1* | 7/2020 | Chen | H04W 74/0833 |
| 2020/0288377 A1* | 9/2020 | Liu | H04W 48/14 |
| 2020/0296765 A1* | 9/2020 | Kim | H04W 56/001 |
| 2021/0136823 A1* | 5/2021 | Kim | H04W 52/36 |
| 2021/0168862 A1* | 6/2021 | Murray | H04W 74/002 |

FOREIGN PATENT DOCUMENTS

| | | |
|---|---|---|
| CN | 103220811 A | 7/2013 |
| CN | 103796315 A | 5/2014 |
| CN | 105451360 A | 3/2016 |
| CN | 106470468 A | 3/2017 |
| CN | 106559203 A | 4/2017 |
| CN | 106714114 A | 5/2017 |
| CN | 106792998 A | 5/2017 |
| EP | 2986075 A1 | 2/2016 |
| WO | 2015042866 A1 | 4/2015 |

OTHER PUBLICATIONS

First Office Action for Chinese Application No. 201710454492.5, dated Nov. 20, 2019, 9 Pages.
Second Office Action for Chinese Application No. 201710454492.5, dated Mar. 20, 2020, 5 Pages.
Third Office Action for Chinese Application No. 201710454492.5, dated Jun. 24, 2020, 3 Pages.
Extended European Search Report for Application No. 18817872.7-1205, dated May 28, 2020, 10 Pages.
Communication Pursuant to Article 94(3) EPC for European Application No. 18817872.7-1205, dated Mar. 1, 2021, 6 Pages.
International Search Report and Written Opinion for Application No. PCT/CN2018/090788, dated Aug. 17, 2018, 9 Pages.
Non-final Rejection for U.S. Appl. No. 16/623,389, dated Jun. 16, 2021, 19 Pages.
Sharp, "Discussion on Msg1 Solution for On-demand SI," 3GPP TSG RAN WG2 #98, Agenda item 10.4.1.5, May 15-19, 2017, R2-1705502, Hangzhou, China, 7 Pages.
LG Electronics Inc., "Other-SI Request and Acquisition in Idle/Inactive," 3GPP TSG-RAN WG2 #98, Agenda item 10.4.1.4, May 15-19, 2017, R2-1705229, Hangzhou, China, 4 Pages.
LG Electronics Inc., "Other-SI Request and Acquisition in Connected," 3GPP TSG-RAN WG2 #98, Agenda item 10.4.1.4, May 15-19, 2017, R2-1705228, Hangzhou, China, 4 Pages.
Huawei et al., "UE Operations After On-demand SI Request," 3GPP TSG RAN WG2 #98, Agenda item 10.4.1.5, May 15-19, 2017, R2-1705172, Hangzhou, China, 4 Pages.
Vivo, "Minimum SI Configuration for Other SI Request via MSG1," 3GPP TSG-RAN WG2 #98, Agenda item 10.4.1.4, May 15-19, 2017, R2-1704586, Hangzhou, China, 5 Pages.
CMCC, "Additional Indication in Scheduling Information for Other SI," 3GPP TSG-RAN WG2 #97bis, Agenda item 10.4.1.4, Apr. 3-7, 2017, R2-1702934, Spokane, Washington, USA, 3 Pages.
Qualcomm Incorporated, "Delivery of System Information," 3GPP TSG-RAN WG2 #97, Agenda item 10.2.2.4, Feb. 13-17, 2017, R2-1701778 (Resubmission of R2-1700587), Athens, Greece, 4 Pages.
Mediatek Inc., "NR SI Unicast," 3GPP TSG-RAN2#97 Meeting, Agenda item 10.2.2.4, Feb. 13-17, 2017, R2-1701362 (Resubmission of R2-1700271), Athens, Greece, 6 Pages.
Mediatek Inc., "NR SI Unicast," 3GPP TSG-RAN2 NR Ad Hoc Meeting, Agenda item 3.2.2.4, Jan. 17-19, 2017, R2-1700271, Spokane, Washington, USA, 6 Pages.
Huawei et al., "Request, Update, and Delivery of "Other Si"," 3GPP TSG-RAN WG2 NR Ad Hoc, Agenda item 3.2.2.4, Jan. 17-19, 2017, R2-1700093, Spokane, Washington, USA, 3 Pages.
CMCC, "Further Considerations on Other SI," 3GPP TSG-RAN WG2 #96, Agenda item 9.2.2.2, Nov. 14-18, 2016, R2-168750, Reno, Nevada, USA, 6 Pages.
Huawei et al., "Further Considerations of "Other SI"," 3GPP TSG-RAN WG2 #96, Agenda item 9.2.2.2, Nov. 14-18, 2016, R2-167580, Reno, Nevada, USA, 6 Pages.
Zte et al., "Consideration on the Other SI Delivery in NR," 3GPP TSG-RAN WG2 #95bis, Agenda item 9.2.2.2, Oct. 10-14, 2016, R2-166343, Kaohsiung, Taiwan, 6 Pages.
Ericsson, "Scheduling and Transmission of SIB1," 3GPP TSG RAN WG2 #61bis, Agenda item 5.2.1.5, Mar. 31-Apr. 4, 2008, Tdoc R2-081485, Shenzhen, China, 3 Pages.
Sony, "Consideration on Remaining System Information Delivery," 3GPP TSG RAN WG1 #88, Agenda item 8.1.1.2.2, Feb. 13-17, 2017, R1-1703149, Athens, Greece, 3 Pages.
Non-final Rejection for U.S. Appl. No. 17/814,563, dated Aug. 8, 2023, 11 Pages.

* cited by examiner

SYSTEM INFORMATION TRANSMISSION METHOD, TERMINAL AND NETWORK DEVICE

CROSS-REFERENCE TO RELATED APPLICATIONS

This application is a continuation of U.S. patent application Ser. No. 17/814,563 filed on Jul. 25, 2022, which is a continuation application of U.S. patent application Ser. No. 16/623,389 filed on Dec. 16, 2019, which is the U.S. national phase of PCT Application PCT/CN2018/090788 filed on Jun. 12, 2018, which claims priority to Chinese patent application No. 201710454492.5 filed on Jun. 14, 2017, which are incorporated herein by reference in their entireties.

TECHNICAL FIELD

The present disclosure relates to the field of communication technologies, and in particular, to a system information transmission method, a terminal and a network device.

BACKGROUND

In order to reduce signaling overhead, improve radio resource utilization and reduce network equipment energy consumption, the 5th Generation (5G) communication system proposes to classify system information into two categories, one is Minimum System Information (MSI), and the other type is Other System Information (Other SI), also known as On-demand System Information (On-demand SI). Other SI contains all system information except Minimum SI. Further, the Other SI is further divided, according to an effective range, into Common System Information (Common SI) shared by a plurality of cells and Cell Specific System Information (Cell Specific SI) for respective cells.

The network device sends the MSI to the terminal UE through a periodic broadcast. Since the Other SI is based on the terminal requirements and is requested by the terminal to the network device. In the 5G system, the network device may configure terminal to request the Other SI through a random access message 1 (MSG1) or a random access message 3 (MSG3). In the random access procedure, the terminal first randomly selects a Preamble from the random access preamble, and calculates a Random Access Radio Network Temporary identity (RA-RNTI). The MSG1 (i.e., the Preamble) is sent to the network device on the physical random access channel. The network device calculates the resources (such as uplink resource blocks, modulation and coding policies, etc.) required by the terminal for sending the MSG3, and uses the RA-RNTI to send the MSG2 to the terminal through the random access response (RAR) on the physical downlink shared channel resource. At this time, the terminals that transmit the Preamble on the same random access resource may receive the MSG2. Then, the terminal sends the MSG3 to the network device on the physical uplink control channel by using the RNTI of the temporary cell, and the network device then sends the MSG4 to the terminal. The terminal specifically determines whether to send the Other SI request by MSG1 or MSG3 according to the Minimum SI configuration or the type of Other SI. For the request of MSG1 and MSG3, the network device may send an acknowledgement (ACK/NACK) message to confirm whether the corresponding request is received.

After receiving the Other SI request from the terminal, the network device may send the corresponding Other SI to the connected terminal through a dedicated signaling, and may also send the corresponding Other SI to terminal in the idle/inactive state through a broadcast. If the terminal in the idle state or the inactive state does not receive the ACK feedback message of the required Other SI request, the Other SI request may be sent again. However, the network device may broadcast all or a part of Other SI at a later time, or may not broadcast any Other SI in a subsequent period of time. As a result, the power consumption of the terminal may be serious if the terminal repeatedly sends the Other SI request when the ACK feedback message is not received.

SUMMARY

A system information transmission method, a terminal and a network device are provided in the embodiments of the present disclosure.

In a first aspect, a system information transmission method performed by a network device side is provided in the embodiments of the present disclosure, including:
  receiving request information for requesting target Other System Information sent by a terminal, where the request information is received through a random access message 1 or a random access message 3, the target Other System Information is at least one of Other System Information, the Other System Information is system information other than Minimum System Information;
  configuring a random access message 2 for the terminal based on the request information; and
  sending the random access message 2 to the terminal;
  where the random access message 2 carries configuration information for indicating a configuration of subsequent broadcast information or indication information indicating whether subsequent broadcast information carries the target Other SI;
  where the method further includes:
  indicating acknowledgement ACK information to the terminal in response to the request information.

In a second aspect, a network device is provided in the embodiments of the present disclosure, including:
  a processor, a memory and a computer program stored in the memory and executable by the processor, where the computer program is executed by the processor to:
  receive request information for requesting target Other System Information sent by a terminal, where the request information is received through a random access message 1 or a random access message 3, the target Other System Information is at least one of Other System Information, the Other System Information is system information other than Minimum System Information;
  configure a random access message 2 for the terminal based on the request information; and
  send the random access message 2 to the terminal;
  where the random access message 2 carries configuration information for indicating a configuration of subsequent broadcast information or indication information indicating whether subsequent broadcast information carries the target Other SI;
  where the computer program is executed by the processor to:
  indicate acknowledgement ACK information to the terminal in response to the request information.

In a third aspect, a system information transmission method is provided in the embodiments of the present disclosure, performed by a terminal side, including:

sending to a network device request information for requesting target Other System Information, where the request information is sent through a random access message 1 or a random access message 3, the target Other System Information is at least one of Other System Information, the Other System Information is system information other than Minimum System Information;

receiving the random access message 2 which is sent by the network device;

where the random access message 2 carries configuration information for indicating a configuration of subsequent broadcast information or indication information indicating whether subsequent broadcast information carries the target Other SI;

where the method further includes:

receiving information which is sent by the network device in response to the request information, wherein the information is configured to indicate acknowledgement ACK information to the terminal side.

BRIEF DESCRIPTION OF THE DRAWINGS

In order to more clearly illustrate the technical solutions of the embodiments of the present disclosure, the drawings used in the description of the embodiments of the present disclosure will be briefly described below. It is obvious that the drawings in the following description are only some embodiments of the present disclosure. Other drawings may also be obtained from those of ordinary skill in the art based on these drawings without the inventive work.

DETAILED DESCRIPTION

The embodiments of the present disclosure are described in detail in the following with reference to the drawings. However, it should be understood that, the present disclosure may be implemented in various ways but not limited to the embodiments of the present disclosure. Instead, these embodiments are provided so that the present disclosure may be more fully understood and the scope of the disclosure may be fully conveyed by those skilled in the art.

The terms "first", "second" and the like in the specification and claims of the present application are configured to distinguish similar objects, and are not necessarily configured to describe a particular order or sequence. It should be understood that the data used may be interchanged where appropriate, such that the embodiments of the present application described herein may be implemented, for example, in a sequence other than those illustrated or described herein. In addition, the terms "comprises" and "comprising" and the variants thereof are intended to cover a non-exclusive inclusion, for example, a process, method, system, product, or device that comprises a series of steps or units is not necessarily limited to those steps or units explicitly listed, but may include the steps or unit that are not explicitly listed or inherent to such processes, methods, products or devices.

Figure 1:
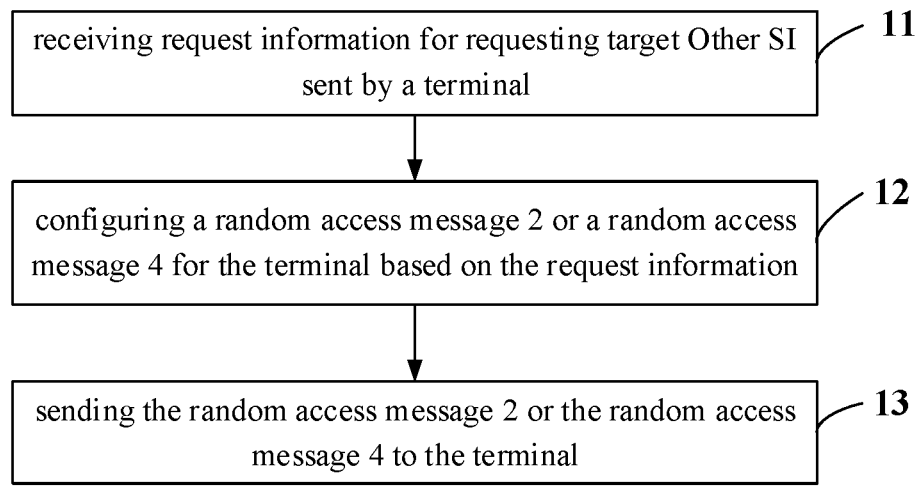
FIG. 1 is a flow chart of a system information transmission method at a network device side in the embodiments of the present disclosure.

A system information transmission method applied to a network device side is provided in the embodiments of the present disclosure. As shown in FIG. 1, the method includes:

Step 11: receiving request information for requesting target Other System Information (Other SI) sent by a terminal, where the target Other SI is at least one of Other SI, the Other SI is system information other than Minimum System Information (MSI), and the request information is sent through a random access message 1 (MSG1) or a random access message 3 (MSG3). It should be noted that, the terminal in the embodiments of the present disclosure is a terminal in the idle/inactive state.

Step 12: configuring a random access message 2 or a random access message 4 for the terminal based on the request information.

According to the correspondence between the messages in the random access procedure, if the request information is sent by the MSG1, the random access message 2 (MSG2) is configured for the terminal by the network device, and if the request information is sent by the MSG3, the random access message 4 (MSG4) is configured for the terminal by the network device.

Step 13: sending the random access message 2 or the random access message 4 to the terminal.

The network device configures for the terminal the MSG2 or MSG4 corresponding to the request information of the terminal, and then sends the MSG2 or MSG4 to the terminal. The MSG2 or the MSG4 carries the configuration information for indicating the configuration of the subsequent broadcast information or the indication information indicating whether the subsequent broadcast information carries the target Other SI, so that the terminal may select the subsequent processing behavior according to the received MSG2 or MSG4. When the subsequent broadcast information does not broadcast any system information of the target Other SI, the request information may not be repeatedly sent, and the broadcast information of the network device is no longer detected, thereby reducing the power consumption of the network device. Alternatively, when all or a part of the system information in the target Other SI is broadcasted in the subsequent broadcast information, the request information may not be repeatedly sent, and the broadcast information of the network device is received on the preset transmission resource.

Further, Step 13 further includes:

sending the random access message 2 or the random access message 4 to the terminal, within a dedicated time window corresponding to the terminal and based on the request information, where the dedicated time window refers to the time window corresponding to each terminal, including a specific random access response (RAR) window (corresponding to MSG2) and a specific Contention resolution timer (corresponding to MSG4);

sending the random access message 2 or the random access message 4 to the terminal, within a common time window and based on the request information, where the common time window refers to a time window shared by a plurality of terminals or all terminals, including: a common random access response time window (corresponding to MSG2) and a common Contention resolution timer (corresponding to MSG4), and it should be noted that the common time window is shared by a plurality of terminals or all terminals. The start time point of the common time window is not later than an earliest start time of the time window corresponding to each terminal of the plurality of terminals or all the terminals, and the end time point of the common time window is not earlier than the latest end time of the time window corresponding to each terminal of the plurality of terminals or all the terminals.

Further, Step 13 specifically includes: configuring a physical downlink control channel for the random access message 2 or the random access message 4; sending the random access message 2 or the random access message 4 to the terminal by a scheduling of the physical downlink control channel.

When the request information is received through the random access message 1, Step 12 specifically includes: configuring the corresponding random access message 2 for the terminal based on the request information. The configuring the corresponding physical downlink control channel for the random access message 2 or the random access message 4 includes: configuring the corresponding physical downlink control channel for the random access message 2.

The configuring the corresponding physical downlink control channel for the random access message 2 includes:

Scrambling method 1: scrambling the physical downlink control channel by a first random access radio network temporary identity.

The first random access radio network temporary identity RA-RNTI is the RA-RNTI in the standard of the related art, which may be calculated by the following formula:

$$RA\text{-}RNTI = 1 + t\_id + 10*f\_id, \text{ or}$$

$$RA\text{-}RNTI = 1 + t\_id + 10*f\_id + 60*(SFN\_id \bmod (W\max/10)),$$

t_id is the time resource of the PRACH resource, i.e., the number index of the first subframe. f_id is the frequency resource of the PRACH resource, i.e., the frequency domain number in the above subframe, SFN_id is the first radio frame number of the PRACH resource, and Wmax is the maximum RAR window length (subframe number), of which the value is 400 in NB-IoT.

In addition, in the 5G NR, in the calculation formula of the RA-RNTI, the synchronization signal SS block or the Beam ID information or other information may also be carried. If a beam-related ID is added, the above formula may further be added with the item corresponding to beam_ID or the item corresponding to other information.

Scrambling method 2: scrambling the physical downlink control channel by a second random access radio network temporary identity carrying system information identity information, the system information identity information is configured to indicate an identity of the Other System Information, that is, the scrambled second RA-RNTI carries the system information identity information SI-ID, and the second RA-RNTIs, which may be corresponding to different SI-IDs, may be different.

Specifically, the system information identity information SI-ID includes at least one of the following: Other System Information identity information SI ID, system information block identity information SIB ID corresponding to the Other SI, system information block group identity information SIB group ID corresponding to the Other SI and system information block functionality identity information SIB Functionality ID corresponding to the Other SI.

Based on the above formula, an optional implementation manner of carrying the system information identity information SI-ID in the RA-RNTI is: RA-RNTI=1+t_id+ 10*f_id+N*SI_ID, or RA-RNTI=1+N*SI_ID+N1*t_id+ N2*f_id or RA-RNTI=1+t_id+N*SI_ID+N1*f_id.

The t_id is the time resource of the PRACH resource, i.e., the number index of the first subframe, and the f_id is the frequency resource of the PRACH resource, i.e., the frequency domain number in the above subframe, and the SI_ID refers to the corresponding system information identity information in the present disclosure, the parameters N, N1, and N2 need to be determined according to the number of time-frequency resources and the amount of system information.

Scrambling method 3: scrambling the physical downlink control channel by a third random access network temporary identity not carrying target time-frequency domain resource information, where the scrambling the physical downlink control channel by a third random access network temporary identity not carrying target time-frequency domain resource information may be calculated using the formula in Scrambling method 1, but the effects of t_id and f_id are not considered, that is, based on the above formula, an optional implementation manner of the present scrambling method is specifically to remove the t_id and f_id items in the RA-RNTI formula.

Scrambling method 4: scrambling the physical downlink control channel by a fourth random access network temporary identity carrying system information identity and not carrying target time-frequency domain resource information, where the Scrambling method 4 is a combination of Scrambling method 2 and Scrambling method 3.

The scenario in which the terminal sends the request information through the MSG1 is described hereinabove. Next, the scenario in which the terminal sends the request information through the MSG3 will be described below.

Specifically, when the request information is received through the random access message 3, Step 12 further includes: configuring the random access message 4 for the terminal based on the request information. The configuring the physical downlink control channel for the random access message 2 or the random access message 4 includes: configuring the physical downlink control channel for the random access message 4.

The configuring the physical downlink control channel for the random access message 4 may include:

Scrambling method 5: scrambling the physical downlink control channel by a temporary cell radio network temporary identity of the terminal.

That is, MSG4 is similar to MSG4 in the standard of the related art. The network device performs the transmission in a unicast manner. The PDCCH corresponding to MSG4 is scrambled by the temporary cell radio network temporary identity (Temp-C-RNTI) of each terminal.

Scrambling method 6: scrambling the physical downlink control channel by a specific radio network temporary identity That is, a specific RNTI may be added, i.e., the MSG3 is not for each terminal and does not need to carry terminal identity information. In other words, the specific radio network temporary identity is shared by all terminals or a plurality of terminals.

Scrambling method 7: scrambling the physical downlink control channel by a radio network temporary identity carrying system information identity information, the system information identity information is configured to indicate an identity of the Other System Information, that is, the scrambled RNTI carries the system information identity information SI-ID, and the RNTIs, which may be corresponding to different SI-IDs, may be different. Specifically, the system information identity information SI-ID includes at least one of the following: Other System Information identity information SI ID, system information block identity information SIB ID corresponding to the Other SI, system information block group identity information SIB group ID corresponding to the Other SI and system information block functionality identity information SIB Functionality ID corresponding to the Other SI.

The PDCCH scrambling mode is described hereinabove. The downlink control information configured in the PDCCH will be described below. Specifically, the downlink control information sent through the physical downlink control channel includes at least one of:

first indication information configured to indicate whether the random access message 2 or the random access message 4 carries the target Other System Information, i.e., N bits are transmitted through the PDCCH to indicate the scheduled MSG4 includes Other SI;

second indication information configured to indicate whether there is current broadcast information or subsequent broadcast information carrying the Other System Information, i.e., N bits are transmitted through the PDCCH to indicate that there is Other SI to be broadcasted subsequent to the scheduled MSG4;

third indication information configured to indicate whether the random access message 2 or the random access message 4 carries system information identity information, i.e., N bits are transmitted through the PDCCH to indicate the scheduled MSG4 includes SI-ID;

fourth indication information configured to indicate whether there is a random access message 2 or a random access message 4 to be sent subsequently, i.e., N bits (N may be 1) are transmitted through the PDCCH to indicate whether there is a MSG4 subsequently;

scheduling information of the subsequent broadcast information, i.e., N bits are transmitted through the PDCCH to indicate the scheduling information broadcasted by the Other SI;

system information identity information configured to indicate an identity of the Other System Information, i.e., N bits are transmitted through the PDCCH to indicate SI-ID, where the system information identity information is configured to indicate an identity of the Other System Information.

It should be noted that, subsequent to the configuring the physical downlink control channel for the random access message 2 or the random access message 4, the method further includes: indicating implicitly an acknowledgement ACK information to the terminal through the configured physical downlink control channel. That is, if any of the above information is carried in the PDCCH, an acknowledgement ACK information may be indicated implicitly to the terminal.

The related configuration procedure and information description of the PDCCH are described above. The related configuration of the random access message 2 or the random access message 4 are further described below.

Specifically, the random access message 2 or the random access message 4 includes at least one of the following:

system information identity information configured to indicate an identity of the Other System Information, where the system information identity information SI-ID includes at least one of the following: Other System Information identity information SI ID, system information block identity information SIB ID corresponding to the Other SI, system information block group identity information SIB group ID corresponding to the Other SI and system information block functionality identity information SIB Functionality ID corresponding to the Other SI;

the identity information of Other System Information carried by the subsequent broadcast information, i.e., the broadcasted Other SI message, where the identity information of Other System Information carried by the subsequent broadcast information is determined according to the request information of the terminal, but is not necessarily the same as the target Other SI requested by the terminal, and the network device may have its own policy;

scheduling information of the subsequent broadcast information, where the scheduling information of the subsequent broadcast information includes at least one of: time domain resource location information corresponding to the subsequent broadcast information, frequency domain resource location information corresponding to the subsequent broadcast information, a broadcast period of the subsequent broadcast information, interval time information of the subsequent broadcast information and repetition times information of the subsequent broadcast information;

acknowledgement ACK information/non-acknowledgement NACK information.

It should be noted that, subsequent to the configuring the corresponding physical downlink control channel for the random access message 2 or the random access message 4, the method further includes: indicating implicitly an acknowledgement ACK information to the terminal through the random access message 2 or the random access message 4. That is, if any of the above information is carried in the MSG2 or the MSG4, an ACK information may be implicitly indicated to the terminal.

Further, because the system information identity information includes at least one of the following: Other System Information identity information, system information block identity information corresponding to the Other SI, system information block group identity information corresponding to the Other SI and system information block functionality identity information corresponding to the Other SI. The Other System Information corresponding to the system information identity information is system information carried by the current broadcast information or the subsequent broadcast information.

In the system information transmission method in the embodiments of the present disclosure, subsequent to the sending the random access message 2 or the random access message 4 to the terminal through the scheduling of the physical downlink control channel, the method further includes: broadcasting the transmission of the Other SI subsequent to the MSG4, which may further includes:

Method 1: sending broadcast information carrying the target Other System Information to the terminal, through transmission resource corresponding to scheduling information of subsequent broadcast information in the physical downlink control channel, i.e., broadcasting through the scheduling of the PDCCH.

Method 2: sending broadcast information carrying the target Other System Information to the terminal, through transmission resource corresponding to scheduling information of subsequent broadcast information in the random access message 2 or the random access message 4, i.e., broadcasting through the scheduling of the MSG4.

Method 3: sending broadcast information carrying the target Other System Information to the terminal, through transmission resource corresponding to scheduling information of subsequent broadcast information in the physical downlink control channel corresponding to the random access message 2 or the random access message 4, i.e., broadcasting through the scheduling of the PDCCH corresponding to MSG4.

Further, the sending the random access message 2 or the random access message 4 to the terminal through the scheduling of the physical downlink control channel further includes:

sending to the terminal downlink control information corresponding to the physical downlink control channel corresponding to the random access message 2 or the random access message 4, within a dedicated time window corresponding to the terminal and based on the request information, where the dedicated time window refers to the time window corresponding to each terminal, including a specific random access response (RAR) window (corresponding to MSG2) and a specific Contention resolution timer (corresponding to MSG4);

sending to the terminal downlink control information corresponding to the physical downlink control channel corresponding to the random access message 2 or the random access message 4, within a common time window and based on the request information, where the common time window refers to a time window shared by a plurality of terminals or all terminals, including: a common random access response time window (corresponding to MSG2) and a common Contention resolution timer (corresponding to MSG4), and it should be noted that the common time window is shared by a plurality of terminals or all terminals, and the common time window starts before an earliest start time of the time window corresponding to each terminal of the plurality of terminals or all the terminals and ends after the latest end time of the time window corresponding to each terminal of the plurality of terminals or all the terminals.

According to the system information transmission method in the embodiments of the present disclosure, when the network device sends the random access message 2 or the random access message 4 based on the request information of the terminal, the random access message 2 or the random access message 4 carries a part of configuration information for indicating the subsequent broadcast information, so as to enable the terminal to determine the subsequent processing based on the configuration information, instead of sending the request information repeatedly in case of not receiving the ACK information, thereby saving the power consumption of the terminal to a certain extent, and also reducing the conflict probability of the random access message through which the request information is sent by the terminal.

The system information transmission method in different scenarios is described in the above embodiments. Next, the corresponding network device will be described in the following embodiments in conjunction with the drawings.

Figure 2:
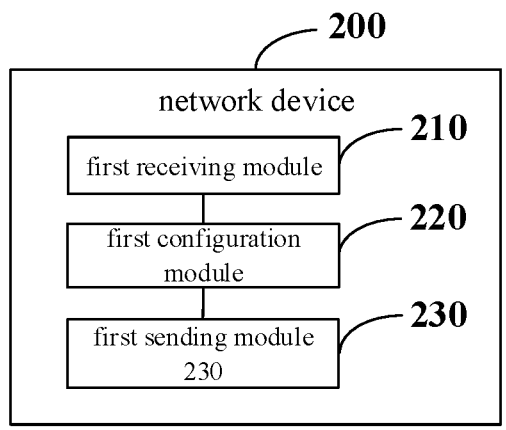
FIG. 2 is a schematic view one of blocks of a network device in the embodiments of the present disclosure.

As shown in FIG. 2, the network device 200 in the embodiments of the present disclosure may perform: receiving request information for requesting target Other System Information sent by a terminal, configuring a random access message 2 or a random access message 4 for the terminal based on the request information, and sending the random access message 2 or the random access message 4 to the terminal, where the request information is received through a random access message 1 or a random access message 3, the target Other System Information is at least one of Other System Information, the Other System Information is system information other than Minimum System Information. The network device 200 includes the following functional modules:

a first receiving module 210, configured to receive request information for requesting target Other System Information sent by a terminal, where the request information is received through a random access message 1 or a random access message 3, the target Other System Information is at least one of Other System Information, the Other System Information is system information other than Minimum System Information;

a first configuration module 220, configured to configure a random access message 2 or a random access message 4 for the terminal based on the request information; and a first sending module 230, configured to send the random access message 2 or the random access message 4 to the terminal.

Figure 3:
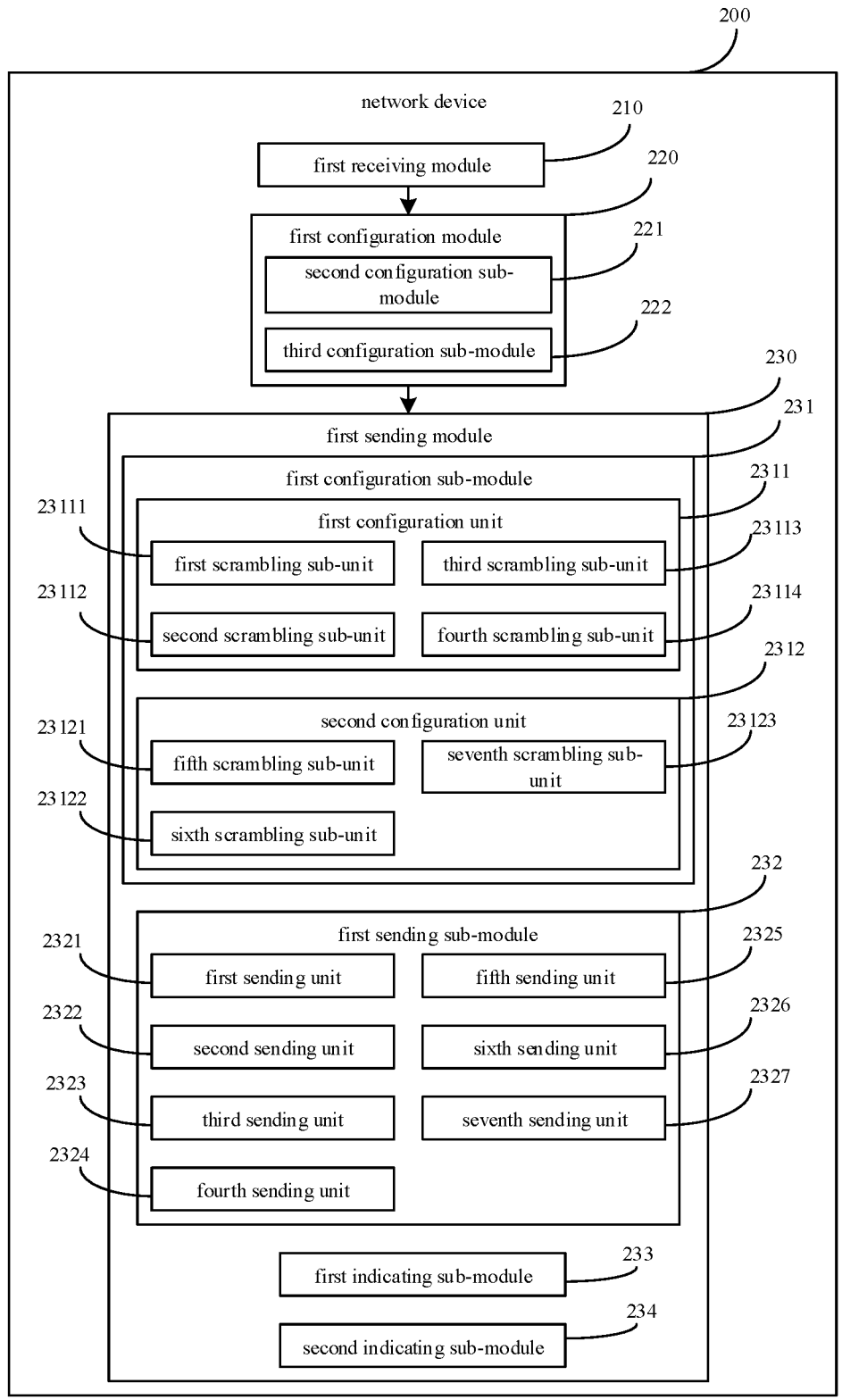
FIG. 3 is a schematic view two of blocks of a network device in the embodiments of the present disclosure.

As shown in FIG. 3, the first sending module 230 includes:

a first configuration sub-module 231, configured to configure a physical downlink control channel for the random access message 2 or the random access message 4;

a first sending sub-module 232, configured to send the random access message 2 or the random access message 4 to the terminal by a scheduling of the physical downlink control channel.

Optionally, the first configuration module 220 includes:

a second configuration sub-module 221, configured to configure the random access message 2 for the terminal based on the request information in the case that the request information is received through the random access message 1;

the first configuration sub-module 221 includes:

a first configuration unit 2311, configured to configure the physical downlink control channel for the random access message 2.

Optionally, the first configuration unit 2311 includes:

a first scrambling sub-unit 23111, configured to scramble the physical downlink control channel by a first random access radio network temporary identity; or a second scrambling sub-unit 23112, configured to scramble the physical downlink control channel by a second random access radio network temporary identity carrying system information identity information, where the system information identity information is configured to indicate an identity of the Other System Information; or a third scrambling sub-unit 23113, configured to scramble the physical downlink control channel by a third random access network temporary identity not carrying target time-frequency domain resource information, where the target time-frequency domain resource information is configured to indicate a time domain resource and a frequency domain resource used by the random access message 1; or a fourth scrambling sub-unit 23114, configured to scramble the physical downlink control channel by a fourth random access network temporary identity carrying system information identity and not carrying target time-frequency domain resource information.

Optionally, the first configuration module 220 includes:

a third configuration sub-module 222, configured to configure the random access message 4 for the terminal based on the request information in the case that the request information is received through the random access message 3;

the first configuration sub-module 231 includes:

a second configuration unit 2312, configured to configure the physical downlink control channel for the random access message 4.

Optionally, the second configuration unit 2312 includes:

a fifth scrambling sub-unit 23121, configured to scramble the physical downlink control channel by a temporary cell radio network temporary identity of the terminal; or a sixth scrambling sub-unit 23122, configured to scramble the physical downlink control channel by a specific radio network temporary identity; or a seventh scrambling sub-unit 23123, configured to scramble the physical downlink control channel by a radio network temporary identity carrying system information identity information, where the system information identity information is configured to indicate an identity of the Other System Information.

Optionally, the specific radio network temporary identity is shared by all terminals or a plurality of terminals.

Optionally, downlink control information sent through the physical downlink control channel includes at least one of:

first indication information configured to indicate whether the random access message 2 or the random access message 4 carries the target Other System Information;

second indication information configured to indicate whether there is current broadcast information or subsequent broadcast information carrying the Other System Information;

third indication information configured to indicate whether the random access message 2 or the random access message 4 carries system information identity information;

fourth indication information configured to indicate whether there is a random access message 2 or a random access message 4 to be sent subsequently;

scheduling information of the subsequent broadcast information;

system information identity information configured to indicate an identity of the Other System Information.

Optionally, the first sending module 230 further includes:

a first indicating sub-module 233, configured to indicate implicitly an acknowledgement ACK information to the terminal through the physical downlink control channel.

Optionally, the random access message 2 or the random access message 4 includes at least one of:

system information identity information configured to indicate an identity of the Other System Information;

identity information of the Other System Information carried by subsequent broadcast information;

scheduling information of the subsequent broadcast information, where the scheduling information of the subsequent broadcast information includes at least one of: time domain resource location information corresponding to the subsequent broadcast information, frequency domain resource location information corresponding to the subsequent broadcast information, a broadcast period of the subsequent broadcast information, interval time information of the subsequent broadcast information and repetition times information of the subsequent broadcast information;

acknowledgement ACK information/non-acknowledgement NACK information.

Optionally, the first sending module 230 further includes:

a second indicating sub-module 234, configured to indicate implicitly an acknowledgement ACK information to the terminal through the random access message 2 or the random access message 4.

Optionally, the system information identity information includes at least one of:

Other System Information identity information, system information block identity information corresponding to the Other System Information, system information block group identity information corresponding to the Other System Information and system information block functionality identity information corresponding to the Other System Information.

Optionally, the Other System Information corresponding to the system information identity information is system information carried by the current broadcast information or the subsequent broadcast information.

Optionally, the first sending sub-module 232 further includes:

a first sending unit 2321, configured to send broadcast information carrying the target Other System Information to the terminal, through transmission resource corresponding to scheduling information of subsequent broadcast information in the physical downlink control channel; or a second sending unit 2322, configured to send broadcast information carrying the target Other System Information to the terminal, through transmission resource corresponding to scheduling information of subsequent broadcast information in the random access message 2 or the random access message 4; or a third sending unit 2323, configured to send broadcast information carrying the target Other System Information to the terminal, through transmission resource corresponding to scheduling information of subsequent broadcast information in the physical downlink control channel corresponding to the random access message 2 or the random access message 4.

Optionally, the first sending sub-module 232 further includes:

a fourth sending unit 2324, configured to send the random access message 2 or the random access message 4 to the terminal, within a dedicated time window corresponding to the terminal and based on the request information; or a fifth sending unit 2325, configured to send the random access message 2 or the random access message 4 to the terminal, within a common time window and based on the request information.

Optionally, the first sending sub-module 232 further includes:

a sixth sending unit 2326, configured to send to the terminal downlink control information corresponding to the physical downlink control channel corresponding to the random access message 2 or the random access message 4, within a dedicated time window corresponding to the terminal and based on the request information; or a seventh sending unit 2327, configured to send to the terminal downlink control information corresponding to the physical downlink control channel corresponding to the random access message 2 or the random access message 4, within a common time window and based on the request information.

According to the network device in the embodiments of the present disclosure, when the network device sends the random access message 2 or the random access message 4 based on the request information of the terminal, the random access message 2 or the random access message 4 carries a part of configuration information for indicating the subsequent broadcast information, so as to enable the terminal to determine the subsequent processing based on the configuration information, instead of sending the request information repeatedly in case of not receiving the ACK information, thereby saving the power consumption of the terminal to a certain extent, and also reducing the conflict probability of the random access message through which the request information is sent by the terminal.

In order to better achieve the above object, a network device is further provided in the embodiments of the present disclosure, including: a processor, a memory and a computer program stored in the memory and executable by the processor, where the computer program is executed by the processor to perform the steps of the above system information transmission method, and the same technical effects can be achieved. To avoid repetition, details thereof are not described herein again.

A computer-readable storage medium is further provided in the embodiments of the present disclosure, where a computer program is stored in the computer-readable storage medium, the computer program is executed by a processor to perform the system information, and the same technical effects can be achieved. To avoid repetition, details thereof are not described herein again. The computer-readable storage medium, such as a read-only memory (ROM), a random access memory (RAM), a magnetic disk or an optical disk.

Figure 4:
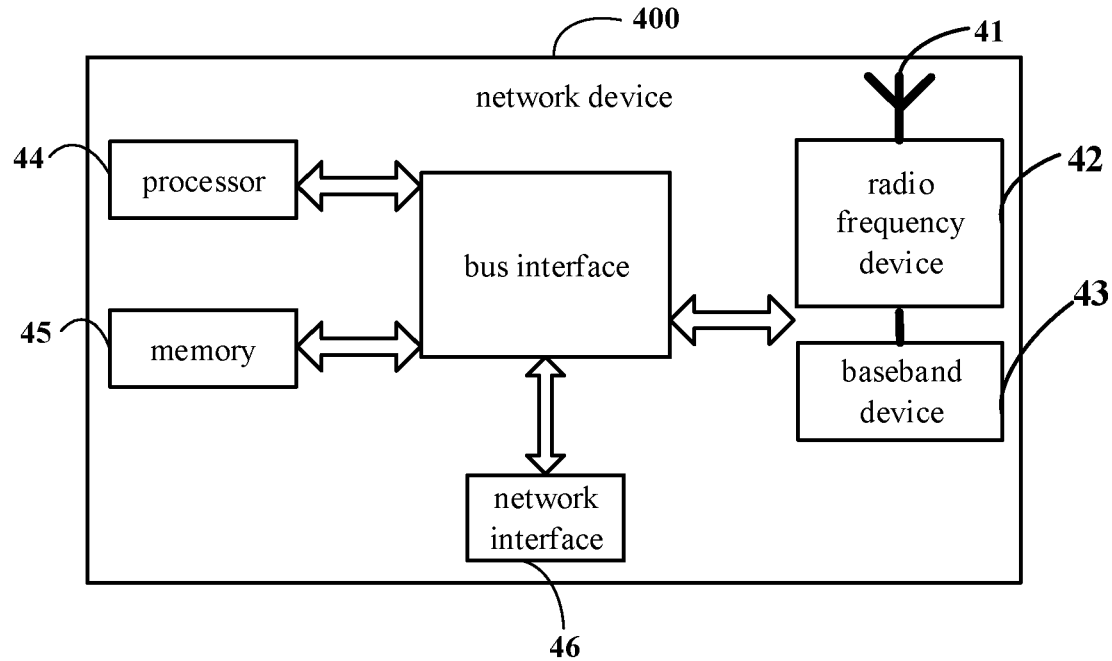
FIG. 4 is a schematic view of a network device in the embodiments of the present disclosure.

Specifically, a network device is further provided in the embodiments of the present disclosure. As shown in FIG. 4, the network device 400 includes an antenna 41, a radio frequency device 42, and a baseband device 43. The antenna 41 is connected to the radio frequency device 42. In the uplink direction, the radio frequency device 42 receives information through the antenna 41 and transmits the received information to the baseband device 43 for processing. In the downlink direction, the baseband device 43 processes the information to be sent and transmits it to the radio frequency device 42, which processes the received information and transmits it via the antenna 41.

The above-described band processing device may be located in the baseband device 43, and the method performed by the network device in the above embodiment may be implemented in the baseband device 43, which includes the processor 144 and the memory 45.

The baseband device 43 may include, for example, at least one baseband board on which a plurality of chips are disposed, as shown in FIG. 4, one of which is, for example, a processor 44, connected to the memory 45 to call a program in the memory 45 to execute the network device operation shown in the above method embodiment.

The baseband device 43 may also include a network interface 46 for interacting with the radio frequency device 42, such as a common public radio interface (CPRI).

The processor here may be a processor or a collective name of multiple processing elements. For example, the processor may be a CPU, an ASIC, or one or more configured to implement the method performed by the above network device. An integrated circuit, such as one or more microprocessor DSPs, or one or more field programmable gate array FPGAs. The storage element can be a memory or a collective name for a plurality of storage elements.

Memory 45 can be either volatile memory or non-volatile memory, or can include both volatile and non-volatile memory. The non-volatile memory may be a Read-Only Memory (ROM), a Programmable ROM (PROM), or an Erasable PROM (EPROM), electrically erasable programmable read only memory (EEPROM) or flash memory. The volatile memory may be a Random Access Memory (RAM), which is used as an external cache. By way of example and not limitation, many forms of RAM are available, such as static random access memory (SRAM), dynamic random access memory (DRAM), synchronous dynamic random access memory (SDRAM), Double Data Rate SDRAM (DDRSDRAM), Enhanced Synchronous Dynamic Random Access Memory (ESDRAM), Synchronized Dynamic Random Access Memory (SLDRAM) and Direct Memory Bus Random Access Memory (DRRAM). The memory 45 described herein is intended to comprise, without being limited to, these and any other suitable types of memory.

Specifically, the network device in the embodiments of the present disclosure further includes: a computer program stored in the memory 45 and executable on the processor 44, and the processor 44 calls a computer program in the memory 45 to execute the method executed by each module shown in FIG. 3.

Specifically, the computer program is called by the processor 44 to: receive request information for requesting target Other System Information sent by a terminal, configure a random access message 2 or a random access message 4 for the terminal based on the request information, and send the random access message 2 or the random access message 4 to the terminal, where the request information is received through a random access message 1 or a random access message 3, the target Other System Information is at least one of Other System Information, the Other System Information is system information other than Minimum System Information.

Specifically, the computer program is called by the processor 44 to: configure a physical downlink control channel for the random access message 2 or the random access message 4; send the random access message 2 or the random access message 4 to the terminal by a scheduling of the physical downlink control channel.

Specifically, the computer program is called by the processor 44 to: configure the random access message 2 for the terminal based on the request information and configure the physical downlink control channel for the random access message 2.

Specifically, the computer program is called by the processor 44 to: scramble the physical downlink control channel by a first random access radio network temporary identity; or scramble the physical downlink control channel by a second random access radio network temporary identity carrying system information identity information, where the system information identity information is configured to indicate an identity of the Other System Information; or scramble the physical downlink control channel by a third random access network temporary identity not carrying target time-frequency domain resource information, where the target time-frequency domain resource information is configured to indicate a time domain resource and a frequency domain resource used by the random access message 1; or scramble the physical downlink control channel by a fourth random access network temporary identity carrying system information identity and not carrying target time-frequency domain resource information.

Specifically, the computer program is called by the processor 44 to: configure the random access message 4 for the terminal based on the request information and configure the physical downlink control channel for the random access message 4.

Specifically, the computer program is called by the processor 44 to: scramble the physical downlink control channel by a temporary cell radio network temporary identity of the terminal; or scramble the physical downlink control channel by a specific radio network temporary identity; or scramble the physical downlink control channel by a radio network temporary identity carrying system information identity information, where the system information identity information is configured to indicate an identity of the Other System Information.

Optionally, the specific radio network temporary identity is shared by all terminals or a plurality of terminals.

Optionally, downlink control information sent through the physical downlink control channel includes at least one of:
first indication information configured to indicate whether the random access message 2 or the random access message 4 carries the target Other System Information;
second indication information configured to indicate whether there is current broadcast information or subsequent broadcast information carrying the Other System Information;
third indication information configured to indicate whether the random access message 2 or the random access message 4 carries system information identity information;
fourth indication information configured to indicate whether there is a random access message 2 or a random access message 4 to be sent subsequently;
scheduling information of the subsequent broadcast information;
system information identity information configured to indicate an identity of the Other System Information.

Specifically, the computer program is called by the processor 44 to: indicate implicitly an acknowledgement ACK information to the terminal through the physical downlink control channel.

Optionally, the random access message 2 or the random access message 4 includes at least one of:
system information identity information configured to indicate an identity of the Other System Information;
identity information of the Other System Information carried by subsequent broadcast information;
scheduling information of the subsequent broadcast information, where the scheduling information of the subsequent broadcast information includes at least one of: time domain resource location information corresponding to the subsequent broadcast information, frequency domain resource location information corresponding to the subsequent broadcast information, a broadcast period of the subsequent broadcast information, interval time information of the subsequent broadcast information and repetition times information of the subsequent broadcast information;
acknowledgement ACK information/non-acknowledgement NACK information.

Specifically, the computer program is called by the processor 44 to: indicate implicitly an acknowledgement ACK information to the terminal through the random access message 2 or the random access message 4.

Optionally, the system information identity information includes at least one of:
Other System Information identity information, system information block identity information corresponding to the Other System Information, system information block group identity information corresponding to the Other System Information and system information block functionality identity information corresponding to the Other System Information.

Optionally, the Other System Information corresponding to the system information identity information is system information carried by the current broadcast information or the subsequent broadcast information.

Specifically, the computer program is called by the processor 44 to: send broadcast information carrying the target Other System Information to the terminal, through transmission resource corresponding to scheduling information of subsequent broadcast information in the physical downlink control channel; or send broadcast information carrying the target Other System Information to the terminal, through transmission resource corresponding to scheduling information of subsequent broadcast information in the random access message 2 or the random access message 4; or send broadcast information carrying the target Other System Information to the terminal, through transmission resource corresponding to scheduling information of subsequent broadcast information in the physical downlink control channel corresponding to the random access message 2 or the random access message 4.

Specifically, the computer program is called by the processor 44 to: send the random access message 2 or the random access message 4 to the terminal, within a dedicated time window corresponding to the terminal and based on the request information; or send the random access message 2 or the random access message 4 to the terminal, within a common time window and based on the request information.

Specifically, the computer program is called by the processor 44 to: send to the terminal downlink control information corresponding to the physical downlink control channel corresponding to the random access message 2 or the random access message 4, within a dedicated time window corresponding to the terminal and based on the request information; or send to the terminal downlink control information corresponding to the physical downlink control channel corresponding to the random access message 2 or the random access message 4, within a common time window and based on the request information.

The network device may include multiple transceiver nodes (TRPs), and may be a base station (Base Transceiver Station, BTS for short) in Global System of Mobile communication (GSM) or Code Division Multiple Access (CDMA), the base station (NodeB, NB for short) in the Wideband Code Division Multiple Access (WCDMA), or the Evolutionary Node B (eNB or eNodeB) in the LTE, or a relay station or an access point, or a base station in a future 5G network, etc., which is not limited herein.

According to the network device in the embodiments of the present disclosure, when the network device sends the random access message 2 or the random access message 4 based on the request information of the terminal, the random access message 2 or the random access message 4 carries a part of configuration information for indicating the subsequent broadcast information, so as to enable the terminal to determine the subsequent processing based on the configuration information, instead of sending the request information repeatedly in case of not receiving the ACK information, thereby saving the power consumption of the terminal to a certain extent, and also reducing the conflict probability of the random access message through which the request information is sent by the terminal.

The system information transmission method at the network side is described in the embodiments of the present disclosure. Next, the system information transmission method at the terminal side will be describe in the following in conjunction of the drawings.

Figure 5:
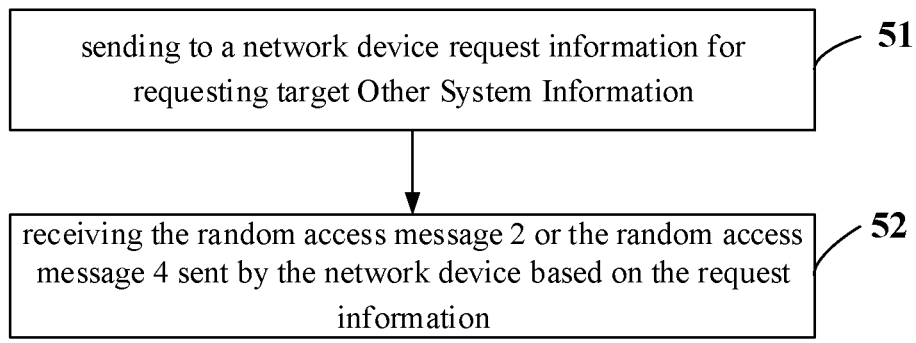
FIG. 5 is a flow chart of a system information transmission method at a terminal side in the embodiments of the present disclosure.

As shown in FIG. 5, the system information transmission method of the embodiment of the present disclosure includes:

Step 51: sending to a network device request information for requesting target Other System Information, where the request information is sent through a random access message 1 or a random access message 3, the target Other System Information is at least one of Other System Information, the Other System Information is system information other than Minimum System Information. It should be noted that, the terminal in the embodiments of the present disclosure is a terminal in the idle/inactive state.

Step 52: receiving the random access message 2 or the random access message 4 which is sent by the network device based on the request information.

According to the correspondence between the messages in the random access procedure, if the request information is sent by the MSG1, the random access message 2 (MSG2) configured for the terminal by the network device is received, and if the request information is sent by the MSG3, the random access message 4 (MSG4) configured for the terminal by the network device is received.

Specifically, the random access message 2 or the random access message 4 includes at least one of the following:

system information identity information configured to indicate an identity of the Other System Information, where the system information identity information SI-ID includes at least one of the following: Other System Information identity information SI ID, system information block identity information SIB ID corresponding to the Other SI, system information block group identity information SIB group ID corresponding to the Other SI and system information block functionality identity information SIB Functionality ID corresponding to the Other SI;

the identity information of Other System Information carried by the subsequent broadcast information, i.e., the broadcasted Other SI message, where the identity information of Other System Information carried by the subsequent broadcast information is determined according to the request information of the terminal, but is not necessarily the same as the target Other SI requested by the terminal, and the network device may have its own policy;

scheduling information of the subsequent broadcast information, where the scheduling information of the subsequent broadcast information includes at least one of: time domain resource location information corresponding to the subsequent broadcast information, frequency domain resource location information corresponding to the subsequent broadcast information, a broadcast period of the subsequent broadcast information, interval time information of the subsequent broadcast information and repetition times information of the subsequent broadcast information;

acknowledgement ACK information/non-acknowledgement NACK information

Subsequent to Step 52, the method further includes: in the case that the random access message 2 or the random access message 4 carries at least one of the system information identity information, the identity information of the Other System Information carried by the subsequent broadcast information and the scheduling information of the subsequent broadcast information, receiving, through preset transmission resource, the subsequent broadcast information sent by the network device. Specifically, in the case that the random access message 2 or the random access message 4 carries the scheduling information of the subsequent broadcast information, the subsequent broadcast information sent by the network device is received through the scheduling information of the subsequent broadcast information.

Further, Step 52 includes: receiving the random access message 2 or the random access message 4 which is sent by the network device based on the request information, within a dedicated time window corresponding to the terminal, where the dedicated time window refers to the time window corresponding to each terminal, including a specific random access response (RAR) window (corresponding to MSG2) and a specific Contention resolution timer (corresponding to MSG4);

receiving the random access message 2 or the random access message 4 which is sent by the network device based on the request information, within a common time window, where the common time window refers to a time window shared by a plurality of terminals or all terminals, including: a common random access response time window (corresponding to MSG2) and a common Contention resolution timer (corresponding to MSG4), and it should be noted that the common time window is shared by a plurality of terminals or all terminals, and the common time window starts before an earliest start time of the time window corresponding to each terminal of the plurality of terminals or all the terminals and ends after the latest end time of the time window corresponding to each terminal of the plurality of terminals or all the terminals.

Further, Step 52 specifically includes: receiving the random access message 2 or the random access message 4 which is sent by the network device based on the request information, by a scheduling of the physical downlink control channel, where the physical downlink control channel is configured for the random access message 2 or the random access message 4 by the network device, where the downlink control information sent through the physical downlink control channel includes at least one of the following:
first indication information configured to indicate whether the random access message 2 or the random access message 4 carries the target Other System Information, i.e., N bits are transmitted through the PDCCH to indicate the scheduled MSG4 includes Other SI;

second indication information configured to indicate whether there is current broadcast information or subsequent broadcast information carrying the Other System Information, i.e., N bits are transmitted through the PDCCH to indicate that there is Other SI to be broadcasted subsequent to the scheduled MSG4;

third indication information configured to indicate whether the random access message 2 or the random access message 4 carries system information identity information, i.e., N bits are transmitted through the PDCCH to indicate the scheduled MSG4 includes SI-ID;

fourth indication information configured to indicate whether there is a random access message 2 or a random access message 4 to be sent subsequently, i.e., N bits (N may be 1) are transmitted through the PDCCH to indicate whether there is a MSG4 subsequently;

scheduling information of the subsequent broadcast information, i.e., N bits are transmitted through the PDCCH to indicate the scheduling information broadcasted by the Other SI;

system information identity information configured to indicate an identity of the Other System Information, i.e., N bits are transmitted through the PDCCH to indicate SI-ID, where the system information identity information is configured to indicate an identity of the Other System Information, where the system information identity information SI-ID includes at least one of the following: Other System Information identity information SI ID, system information block identity information SIB ID corresponding to the Other SI, system information block group identity information SIB group ID corresponding to the Other SI and system information block functionality identity information SIB Functionality ID corresponding to the Other SI.

Subsequent to the receiving the random access message 2 or the random access message 4 which is sent by the network device based on the request information, by the scheduling of the physical downlink control channel, the method further includes:

in the case that the physical downlink control channel carries at least one of the second indication information, the third indication information, the scheduling information of the subsequent broadcast information and the system information identity information, receiving, through preset transmission resource, the subsequent broadcast information sent by the network device. To be specific, in the case that the scheduling information of the subsequent broadcast information is carried in the physical downlink control channel, the subsequent broadcast information sent by the network device is received based on the scheduling information of the subsequent broadcast information.

The receiving the random access message 2 or the random access message 4 which is sent by the network device based on the request information, by the scheduling of the physical downlink control channel includes:

receiving downlink control information corresponding to the physical downlink control channel corresponding to the random access message 2 or the random access message 4 which is sent by the network device based on the request information, within a dedicated time window corresponding to the terminal, where the dedicated time window refers to the time window corresponding to each terminal, including a specific random access response (RAR) window (corresponding to MSG2) and a specific Contention resolution timer (corresponding to MSG4);

receiving downlink control information corresponding to the physical downlink control channel corresponding to the random access message 2 or the random access message 4 which is sent by the network device based on the request information, within a common time window, where the common time window refers to a time window shared by a plurality of terminals or all terminals, including: a common random access response time window (corresponding to MSG2) and a common Contention resolution timer (corresponding to MSG4), and it should be noted that the common time window is shared by a plurality of terminals or all terminals, and the common time window starts before an earliest start time of the time window corresponding to each terminal of the plurality of terminals or all the terminals and ends after the latest end time of the time window corresponding to each terminal of the plurality of terminals or all the terminals.

According to the system information transmission method in the embodiments of the present disclosure, when the terminal is to request the Other System Information, the terminal may send the request information to the network device, and then the network device configures, based on the request information, the random access message 2 or the random access message 4 carrying the configuration information for indicating the subsequent broadcast information, so as to enable the terminal to determine the subsequent processing based on the configuration information of the subsequent broadcast information after receiving the random access message 2 or the random access message 4, instead of sending the request information repeatedly in case of not receiving the ACK information, thereby saving the power consumption of the terminal to a certain extent.

The system information transmission method in different scenarios is described in the above embodiments. Next, the corresponding terminal will be described in the following embodiments in conjunction with the drawings.

Figure 6:
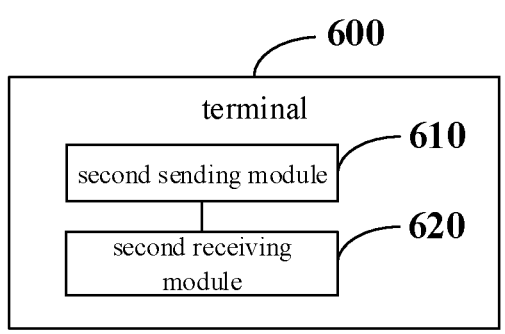
FIG. 6 is a schematic view one of blocks of a terminal in the embodiments of the present disclosure.

As shown in FIG. 6, the terminal 600 in the embodiments of the present disclosure may perform: sending to a network device request information for requesting target Other System Information, receiving the random access message 2 or the random access message 4 which is sent by the network device based on the request information, where the request information is sent through a random access message 1 or a random access message 3, the target Other System Information is at least one of Other System Information, the Other System Information is system information other than Minimum System Information. The terminal 600 includes the following functional modules:

a second sending module 610, configured to send to a network device request information for requesting target Other System Information, where the request information is sent through a random access message 1 or a random access message 3, the target Other System Information is at least one of Other System Information, the Other System Information is system information other than Minimum System Information;

a second receiving module 620, configured to receive the random access message 2 or the random access message 4 which is sent by the network device based on the request information.

Figure 7:
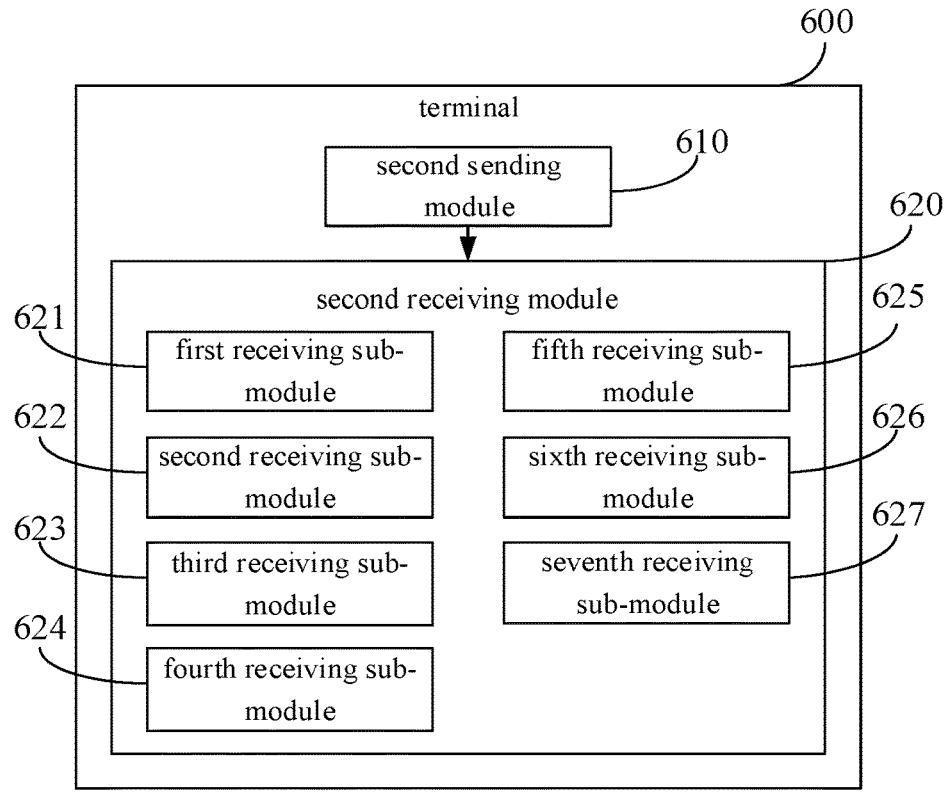
FIG. 7 is a schematic view two of blocks of a terminal in the embodiments of the present disclosure.

Optionally, as shown in FIG. 7, the second receiving module 620 includes:

a first receiving sub-module 621, configured to receive the random access message 2 or the random access message 4 which is sent by the network device based on the request information, by a scheduling of the physical downlink control channel, where the physical downlink control channel is configured for the random access message 2 or the random access message 4 by the network device.

Optionally, the second receiving module 620 includes:

a second receiving sub-module 622, configured to receive downlink control information corresponding to the physical downlink control channel corresponding to the random access message 2 or the random access message 4 which is sent by the network device based on the request information, within a dedicated time window corresponding to the terminal; or a third receiving sub-module 623, configured to receive downlink control information corresponding to the physical downlink control channel corresponding to the random access message 2 or the random access message 4 which is sent by the network device based on the request information, within a common time window.

Optionally, the second receiving module 620 includes:

a fourth receiving sub-module 624, configured to receive the random access message 2 or the random access message 4 which is sent by the network device based on the request information, within a dedicated time window corresponding to the terminal; or a fifth receiving sub-module 625, configured to receive the random access message 2 or the random access message 4 which is sent by the network device based on the request information, within a common time window.

Optionally, downlink control information sent through the physical downlink control channel includes at least one of:

first indication information configured to indicate whether the random access message 2 or the random access message 4 carries the target Other System Information;

second indication information configured to indicate whether there is current broadcast information or subsequent broadcast information carrying the Other System Information;

third indication information configured to indicate whether the random access message 2 or the random access message 4 carries system information identity information;

fourth indication information configured to indicate whether there is a random access message 2 or a random access message 4 to be sent subsequently;

scheduling information of the subsequent broadcast information;

system information identity information configured to indicate an identity of the Other System Information.

Optionally, the second receiving module 620 further includes:

a sixth receiving sub-module 626, configured to, in the case that the physical downlink control channel carries at least one of the second indication information, the third indication information, the scheduling information of the subsequent broadcast information and the system information identity information, receive, through preset transmission resource, the subsequent broadcast information sent by the network device.

Optionally, the random access message 2 or the random access message 4 includes at least one of:

system information identity information configured to indicate an identity of the Other System Information;

identity information of the Other System Information carried by subsequent broadcast information;

scheduling information of the subsequent broadcast information, where the scheduling information of the subsequent broadcast information includes at least one of: time domain resource location information corresponding to the subsequent broadcast information, frequency domain resource location information corresponding to the subsequent broadcast information, a broadcast period of the subsequent broadcast information, interval time information of the subsequent broadcast information and repetition times information of the subsequent broadcast information;

acknowledgement ACK information/non-acknowledgement NACK information.

Optionally, the second receiving module 620 further includes:

a seventh receiving sub-module 627, configured to, in the case that the random access message 2 or the random access message 4 carries at least one of the system information identity information, the identity information of the Other System Information carried by the subsequent broadcast information and the scheduling information of the subsequent broadcast information, receive, through preset transmission resource, the subsequent broadcast information sent by the network device.

Optionally, the system information identity information includes at least one of:

Other System Information identity information, system information block identity information corresponding to the Other System Information, system information block group identity information corresponding to the Other System Information and system information block functionality identity information corresponding to the Other System Information.

It should be noted that, according to the terminal in the embodiments of the present disclosure, when the terminal is to request the Other System Information, the terminal may send the request information to the network device, and then the network device configures, based on the request information, the random access message 2 or the random access message 4 carrying the configuration information for indicating the subsequent broadcast information, so as to enable the terminal to determine the subsequent processing based on the configuration information of the subsequent broadcast information after receiving the random access message 2 or the random access message 4, instead of sending the request information repeatedly in case of not receiving the ACK information, thereby saving the power consumption of the terminal to a certain extent.

It should be noted that the division of each module of the above network device and terminal is only a division of logical functions. In actual implementation, it may be integrated into one physical entity in whole or in part, or may be physically separated. In addition, these modules may all be implemented by calling software by the processing component, or all of them can be implemented in hardware form; some modules can be realized by calling software by the processing component, and the other modules are all implemented by hardware. For example, the determining module may be a separately set processing element, or may be integrated in one of the above-mentioned devices, or may be stored in the memory of the above device in the form of program code, and called and executed by the above processing element to implement the functions of the above determination module. The implementation of other modules is similar. In addition, all or part of these modules can be integrated or implemented independently. The processing elements described herein can be an integrated circuit with signal processing capabilities. In the implementation process, each step of the above method or each of the above modules may be completed by an integrated logic circuit of hardware in the processor element or an instruction in a form of software.

For example, the above modules may be one or more integrated circuits configured to implement the above method, such as one or more Application Specific Integrated Circuits (ASICs), or one or more microprocessors (digital signal processor, DSP for short), or one or more Field Programmable Gate Array (FPGA). For another example, when one of the above modules is implemented in the form of a processing component scheduler code, the processing component may be a general purpose processor, such as a central processing unit (CPU) or other processor that can call the program code. As another example, these modules can be integrated and implemented in the form of a system-on-a-chip (SOC).

In order to better achieve the above object, a terminal is further provided in the embodiments of the present disclosure, including: a processor, a memory and a computer program stored in the memory and executable by the processor, where the computer program is executed by the processor to perform the steps of the above system information transmission method, and the same technical effects can be achieved. To avoid repetition, details thereof are not described herein again.

A computer-readable storage medium is further provided in the embodiments of the present disclosure, where a computer program is stored in the computer-readable storage medium, the computer program is executed by a processor to perform the system information, and the same technical effects can be achieved. To avoid repetition, details thereof are not described herein again. The computer-readable storage medium, such as a read-only memory (ROM), a random access memory (RAM), a magnetic disk or an optical disk.

Figure 8:
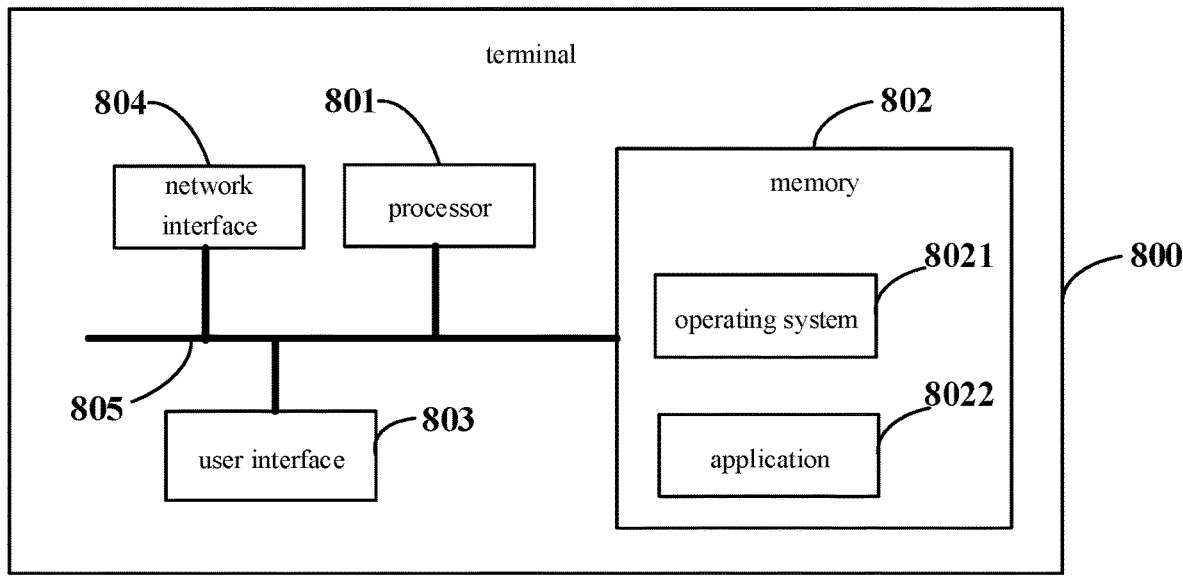
FIG. 8 is a schematic view of a terminal in the embodiments of the present disclosure.

Specifically, FIG. 8 is a schematic view of a terminal in the embodiments of the present disclosure. The terminal 800 shown in FIG. 8 includes at least one processor 801, a memory 802, a user interface 803, and a network interface 804. The various components in terminal 800 are coupled together by a bus system 805. It will be appreciated that the bus system 805 is configured to implement connection communication between these components. The bus system 805 includes a power bus, a control bus, and a status signal bus in addition to the data bus. However, for clarity of description, various buses are labeled as bus system 805 in FIG. 8.

The user interface 803 can include a display or a pointing device (e.g., a touchpad or touch screen, etc.).

It should be understood that the memory 802 in the embodiments of the present disclosure may be a volatile memory or a non-volatile memory, or may include both volatile and non-volatile memory. The non-volatile memory may be a read-only memory (ROM), a programmable read only memory (PROM), an erasable programmable read only memory (EPROM), or an electric Erase programmable read only memory (EEPROM) or flash memory. The volatile memory can be a Random Access Memory (RAM) that acts as an external cache. By way of example and not limitation, many forms of RAM are available, such as static random access memory (SRAM), dynamic random access memory (DRAM), synchronous dynamic random access memory (SDRAM), Double Data Rate SDRAM (DDRSDRAM), Enhanced Synchronous Dynamic Random Access Memory (ESDRAM), Synchronous Connection Dynamic Random Access Memory (SDRAM) and Direct memory bus random access memory (DRRAM). Memory 802 of the systems and methods described herein is intended to comprise, without being limited to, these and any other suitable types of memory.

In some embodiments, the memory 802 stores elements, executable modules or data structures, or a subset thereof, or their extended set: operating system 8021 and application 8022.

The operating system 8021 includes various system programs, such as a framework layer, a core library layer, a driver layer, and the like, for implementing various basic services and processing hardware-based tasks. The application 8022 includes various applications, such as a media player (Media Player), a browser, and the like, for implementing various application services. A program implementing the method of the embodiment of the present disclosure may be included in the application 8022.

In an embodiment of the present disclosure, the terminal 800 further includes: a computer program stored on the memory 802 and executable on the processor 801, and specifically, may be a computer program in the application 8022, the computer program is executed by the processor 801 to perform: sending to a network device request information for requesting target Other System Information, receiving the random access message 2 or the random access message 4 which is sent by the network device based on the request information, where the request information is sent through a random access message 1 or a random access message 3, the target Other System Information is at least one of Other System Information, the Other System Information is system information other than Minimum System Information.

The method disclosed in the above embodiments of the present disclosure may be applied to the processor 801 or implemented by the processor 801. Processor 801 may be an integrated circuit chip with signal processing capabilities. In the implementation process, each step of the foregoing method may be completed by an integrated logic circuit of hardware in the processor 801 or an instruction in a form of software. The processor 801 may be a general-purpose processor, a digital signal processor (DSP), an application specific integrated circuit (ASIC), a field programmable gate array (FPGA), or the like. Programming logic devices, discrete gates or transistor logic devices, discrete hardware components. The methods, steps, and logical block diagrams disclosed in the embodiments of the present disclosure may be implemented or carried out. The general purpose processor may be a microprocessor or the processor or any conventional processor or the like. The steps of the method disclosed in the embodiments of the present disclosure may be directly implemented by the hardware decoding processor, or may be performed by a combination of hardware and software modules in the decoding processor. The software module can be located in a conventional storage medium such as random access memory, flash memory, read only memory, programmable read only memory or electrically erasable programmable memory, registers, and the like. The storage medium is located in memory 802, and processor 801 reads the information in memory 802 and, in conjunction with its hardware, performs the steps of the above method.

It will be appreciated that the embodiments described herein can be implemented in hardware, software, firmware, middleware, microcode, or a combination thereof. For hardware implementation, the processing unit can be implemented in one or more Application Specific Integrated Circuits (ASICs), Digital Signal Processing (DSP), Digital Signal Processing Equipment (DSPD), programmable logic. Programmable Logic Device (PLD), Field-Programmable Gate Array (FPGA), general purpose processor, controller, microcontroller, microprocessor, other electronic unit for performing the functions described herein or a combination thereof.

For a software implementation, the techniques described herein can be implemented by modules (e.g., procedures, functions, and so on) that perform the functions described herein. The software code can be stored in memory and executed by the processor. The memory can be implemented in the processor or external to the processor.

Optionally, the computer program is executed by the processor 801 to: receive the random access message 2 or the random access message 4 which is sent by the network device based on the request information, by a scheduling of the physical downlink control channel.

Optionally, the computer program is executed by the processor 801 to: receive downlink control information corresponding to the physical downlink control channel corresponding to the random access message 2 or the random access message 4 which is sent by the network device based on the request information, within a dedicated time window corresponding to the terminal; or receive downlink control information corresponding to the physical downlink control channel corresponding to the random access message 2 or the random access message 4 which is sent by the network device based on the request information, within a common time window.

Optionally, the computer program is executed by the processor 801 to: receive the random access message 2 or the random access message 4 which is sent by the network device based on the request information, within a dedicated time window corresponding to the terminal; or receive the random access message 2 or the random access message 4 which is sent by the network device based on the request information, within a common time window.

Optionally, downlink control information sent through the physical downlink control channel includes at least one of:
first indication information configured to indicate whether the random access message 2 or the random access message 4 carries the target Other System Information;
second indication information configured to indicate whether there is current broadcast information or subsequent broadcast information carrying the Other System Information;
third indication information configured to indicate whether the random access message 2 or the random access message 4 carries system information identity information;
fourth indication information configured to indicate whether there is a random access message 2 or a random access message 4 to be sent subsequently;
scheduling information of the subsequent broadcast information;
system information identity information configured to indicate an identity of the Other System Information.

Optionally, the computer program is executed by the processor 801 to: in the case that the physical downlink control channel carries at least one of the second indication information, the third indication information, the scheduling information of the subsequent broadcast information and the system information identity information, receive, through preset transmission resource, the subsequent broadcast information sent by the network device.

Optionally, the random access message 2 or the random access message 4 includes at least one of:
system information identity information configured to indicate an identity of the Other System Information;
identity information of the Other System Information carried by subsequent broadcast information;
scheduling information of the subsequent broadcast information, where the scheduling information of the subsequent broadcast information includes at least one of: time domain resource location information corresponding to the subsequent broadcast information, frequency domain resource location information corresponding to the subsequent broadcast information, a broadcast period of the subsequent broadcast information, interval time information of the subsequent broadcast information and repetition times information of the subsequent broadcast information; acknowledgement ACK information/non-acknowledgement NACK information.

Optionally, the computer program is executed by the processor 801 to: in the case that the random access message 2 or the random access message 4 carries at least one of the system information identity information, the identity information of the Other System Information carried by the subsequent broadcast information and the scheduling information of the subsequent broadcast information, receive, through preset transmission resource, the subsequent broadcast information sent by the network device.

Optionally, the system information identity information includes at least one of:
Other System Information identity information, system information block identity information corresponding to the Other System Information, system information block group identity information corresponding to the Other System Information and system information block functionality identity information corresponding to the Other System Information.

The terminal may be a wireless terminal or a wired terminal, and the wireless terminal may be a device that provides voice and/or other service data connectivity to the user, a handheld device with a wireless connection function, or other processing device connected to the wireless modem. The wireless terminal can communicate with one or more core networks via a Radio Access Network (RAN), which can be a mobile terminal, such as a mobile phone (or "cellular" phone) and a mobile terminal. The computer, for example, can be a portable, pocket, handheld, computer built-in or in-vehicle mobile device that exchanges language and/or data with the wireless access network. For example, Personal Communication Service (PCS) telephone, cordless telephone, Session Initiation Protocol (SIP) telephone, Wireless Local Loop (WLL) station, Personal Digital Assistant (Personal Digital Assistant), referred to as PDA) and other equipment. The wireless terminal may also be referred to as a system, a subscriber unit, a subscriber station, a mobile station, a mobile station, a remote station, a remote terminal, and a remote terminal, an access terminal, the user terminal, the user agent, and the user equipment, which is not limited herein.

According to the terminal in the embodiments of the present disclosure, when the terminal is to request the Other System Information, the terminal may send the request information to the network device, and then the network device configures, based on the request information, the random access message 2 or the random access message 4 carrying the configuration information for indicating the subsequent broadcast information, so as to enable the terminal to determine the subsequent processing based on the configuration information of the subsequent broadcast information after receiving the random access message 2 or the random access message 4, instead of sending the request information repeatedly in case of not receiving the ACK information, thereby saving the power consumption of the terminal to a certain extent.

Those skilled in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods for implementing the described functions for each particular application, but such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the embodiments provided by the present application, it should be understood that the disclosed apparatus and method may be implemented in other manners. For example, the device embodiments described above are merely illustrative. For example, the division of the unit is only a logical function division. In actual implementation, there may be another division manner, for example, multiple units or components may be combined or can be integrated into another system, or some features can be ignored or not executed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, the functional units in the embodiments of the present disclosure may be integrated into one processing unit, or each unit may exist physically separately, or two or more units may be integrated into one unit.

The functions may be stored in a computer-readable storage medium if implemented in the form of a software functional unit and sold or used as a standalone product. Based on such understanding, the technical solution of the present disclosure, which is essential or contributes to the prior art, or a part of the technical solution, may be embodied in the form of a software product, which is stored in a storage medium, including The instructions are configured to cause a computer device (which may be a personal computer, server, or network device, etc.) to perform all or part of the steps of the methods described in various embodiments of the present disclosure. The foregoing storage medium includes various media that can store program codes, such as a USB flash drive, a mobile hard disk, a ROM, a RAM, a magnetic disk, or an optical disk.

Moreover, it should be noted that in the apparatus and method of the present disclosure, it is apparent that the various components or steps may be decomposed and/or recombined. These decompositions and/or re-combinations should be considered as equivalents to the disclosure. Also, the steps of performing the above-described series of processes may naturally be performed in chronological order in the order illustrated, but need not necessarily be performed in chronological order, and some steps may be performed in parallel or independently of each other. It will be appreciated by those skilled in the art that all or any of the steps or components of the method and apparatus of the present disclosure may be in the network of any computing device (including a processor, storage medium, etc.) or computing device, in hardware or firmware. The software, or a combination thereof, is implemented by those of ordinary skill in the art using their basic programming skills while reading the description of the present disclosure.

Thus, the objects of the disclosure may also be achieved by running a program or a set of programs on any computing device. The computing device can be a well-known general purpose device. Accordingly, the object of the present disclosure may also be achieved by merely providing a program product comprising program code for implementing the method or apparatus. That is, such a program product also constitutes the present disclosure, and a storage medium storing such a program product also constitutes the present disclosure. It will be apparent that the storage medium may be any known storage medium or any storage medium developed in the future. It should also be noted that in the apparatus and method of the present disclosure, it is apparent that the various components or steps may be decomposed and/or recombined. These decompositions and/or re-combinations should be considered as equivalents to the disclosure. Also, the steps of performing the series of processes described above may naturally be performed in chronological order in the order illustrated, but need not necessarily be performed in chronological order. Certain steps may be performed in parallel or independently of one another.

The above are only some embodiments of the present disclosure, and it should be noted that those skilled in the art may also make several improvements and refinements without departing from the principles of the present disclosure, which should also be considered as the scope of the present disclosure.

What is claimed is:

1. A network device, comprising: a processor, a memory and a computer program stored in the memory and executable by the processor, wherein the computer program is executed by the processor to:

receive request information for requesting target Other System Information sent by a terminal, wherein the request information is received through a random access message 1 or a random access message 3, the target Other System Information is at least one of Other System Information, the Other System Information is system information other than Minimum System Information;

configure a random access message 2 for the terminal based on the request information; and send the random access message 2 to the terminal;

wherein the random access message 2 carries configuration information for indicating a configuration of subsequent broadcast information or indication information indicating whether subsequent broadcast information carries the target Other SI;
wherein the computer program is executed by the processor to:
indicate acknowledgement ACK information to the terminal in response to the request information;
wherein the computer program is executed by the processor to:
indicate implicitly the ACK information to the terminal through a physical downlink control channel; or,
indicate implicitly the ACK information to the terminal through the random access message 2 or a random access message 4.

2. The network device according to claim 1, wherein the computer program is executed by the processor to:
configure a physical downlink control channel for the random access message 2 or the random access message 4;
send the random access message 2 to the terminal by a scheduling of the physical downlink control channel.

3. The network device according to claim 2, wherein in the case that the request information is received through the random access message 1, the computer program is executed by the processor to:
configure the random access message 2 for the terminal based on the request information;
wherein the computer program is executed by the processor to:
configure the physical downlink control channel for the random access message 2.

4. The network device according to claim 3, wherein the computer program is executed by the processor to:
scramble the physical downlink control channel by a first random access radio network temporary identity; or
scramble the physical downlink control channel by a second random access radio network temporary identity carrying system information identity information, wherein the system information identity information is configured to indicate an identity of the Other System Information; or
scramble the physical downlink control channel by a third random access network temporary identity not carrying target time-frequency domain resource information, wherein the target time-frequency domain resource information is configured to indicate a time domain resource and a frequency domain resource used by the random access message 1; or
scramble the physical downlink control channel by a fourth random access network temporary identity carrying system information identity and not carrying target time-frequency domain resource information.

5. The network device according to claim 2, wherein in the case that the request information is received through the random access message 3, the computer program is executed by the processor to:
configure the random access message 4 for the terminal based on the request information;
wherein the computer program is executed by the processor to:
configure the physical downlink control channel for the random access message 4.

6. The network device according to claim 2, wherein the downlink control information sent through the physical downlink control channel comprises at least one of:
first indication information configured to indicate whether the random access message 2 carries the target Other System Information;
second indication information configured to indicate whether there is current broadcast information or the subsequent broadcast information carrying the Other System Information;
third indication information configured to indicate whether the random access message 2 carries system information identity information;
fourth indication information configured to indicate whether there is a random access message 2 to be sent subsequently;
scheduling information of the subsequent broadcast information;
system information identity information configured to indicate an identity of the Other System Information.

7. The network device according to claim 1, wherein the random access message 2 comprises at least one of:
system information identity information configured to indicate an identity of the Other System Information;
identity information of the Other System Information carried by the subsequent broadcast information;
scheduling information of the subsequent broadcast information, wherein the scheduling information of the subsequent broadcast information comprises at least one of: time domain resource location information corresponding to the subsequent broadcast information, frequency domain resource location information corresponding to the subsequent broadcast information, a broadcast period of the subsequent broadcast information, interval time information of the subsequent broadcast information and repetition times information of the subsequent broadcast information;
acknowledgement ACK information/non-acknowledgement NACK information.

8. The network device according to claim 2, wherein subsequent to the sending the random access message 2 to the terminal through the physical downlink control channel, the computer program is executed by the processor to:
send broadcast information carrying the target Other System Information to the terminal, through transmission resource corresponding to scheduling information of the subsequent broadcast information in the physical downlink control channel; or send broadcast information carrying the target Other System Information to the terminal, through transmission resource corresponding to scheduling information of the subsequent broadcast information in the random access message 2 or the random access message 4; or send broadcast information carrying the target Other System Information to the terminal, through transmission resource corresponding to scheduling information of the subsequent broadcast information in the physical downlink control channel corresponding to the random access message 2 or the random access message 4.

9. The network device according to claim 2, wherein the computer program is executed by the processor to:
send to the terminal downlink control information corresponding to the physical downlink control channel corresponding to the random access message 2 or the random access message 4, within a dedicated time window corresponding to the terminal and based on the request information; or
send to the terminal downlink control information corresponding to the physical downlink control channel corresponding to the random access message 2 or the random access message 4, within a common time window and based on the request information.

10. The network device according to claim 4, wherein the system information identity information comprises at least one of:
Other System Information identity information, system information block identity information corresponding to the Other System Information, system information block group identity information corresponding to the Other System Information and system information block functionality identity information corresponding to the Other System Information.

11. The network device according to claim 10, wherein the Other System Information corresponding to the system information identity information is system information carried by the current broadcast information or the subsequent broadcast information.

12. A terminal, comprising: a processor, a memory and a computer program stored in the memory and executable by the processor, wherein the computer program is executed by the processor to:
send to a network device request information for requesting target Other System Information, wherein the request information is sent through a random access message 1 or a random access message 3, the target Other System Information is at least one of Other System Information, the Other System Information is system information other than Minimum System Information;
receive the random access message 2 which is sent by the network device;
wherein the random access message 2 carries configuration information for indicating a configuration of subsequent broadcast information or indication information indicating whether subsequent broadcast information carries the target Other SI;
wherein the computer program is executed by the processor to:
receive information which is sent by the network device in response to the request information, wherein the information is configured to indicate acknowledgement ACK information to the terminal side;
wherein the computer program is executed by the processor to:
receive the random access message 2 which is sent by the network device, by a scheduling of the physical downlink control channel, wherein the physical downlink control channel is configured for the random access message 2 by the network device.

13. The terminal according to claim 12, wherein the computer program is executed by the processor to:
receive downlink control information corresponding to the physical downlink control channel corresponding to the random access message 2 which is sent by the network device, within a dedicated time window corresponding to the terminal; or
receive downlink control information corresponding to the physical downlink control channel corresponding to the random access message 2 which is sent by the network device, within a common time window.

14. The terminal according to claim 12, wherein downlink control information sent through the physical downlink control channel comprises at least one of:
first indication information configured to indicate whether the random access message 2 carries the target Other System Information;
second indication information configured to indicate whether there is current broadcast information or the subsequent broadcast information carrying the Other System Information;
third indication information configured to indicate whether the random access message 2 carries system information identity information;
fourth indication information configured to indicate whether there is a random access message 2 to be sent subsequently;
scheduling information of the subsequent broadcast information;
system information identity information configured to indicate an identity of the Other System Information;
wherein receiving the random access message 2 which is sent by the network device, by the scheduling of the physical downlink control channel further comprises:
in the case that the physical downlink control channel carries at least one of the second indication information, the third indication information, the scheduling information of the subsequent broadcast information and the system information identity information, receiving, through preset transmission resources, the subsequent broadcast information sent by the network device.

15. The terminal according to claim 14, wherein the computer program is executed by the processor to:
in the case that the physical downlink control channel carries at least one of the second indication information, the third indication information, the scheduling information of the subsequent broadcast information and the system information identity information, receive, through preset transmission resource, the subsequent broadcast information sent by the network device.

16. The terminal according to claim 12, wherein the random access message 2 comprises at least one of:
system information identity information configured to indicate an identity of the Other System Information;
identity information of the Other System Information carried by the subsequent broadcast information;
scheduling information of the subsequent broadcast information, wherein the scheduling information of the subsequent broadcast information comprises at least one of: time domain resource location information corresponding to the subsequent broadcast information, frequency domain resource location information corresponding to the subsequent broadcast information, a broadcast period of the subsequent broadcast information, interval time information of the subsequent broadcast information and repetition times information of the subsequent broadcast information;
acknowledgement ACK information/non-acknowledgement NACK information.

17. The terminal according to claim 16, wherein the computer program is executed by the processor to:
in the case that the random access message 2 or the random access message 4 carries at least one of the system information identity information, the identity information of the Other System Information carried by the subsequent broadcast information and the scheduling information of the subsequent broadcast information, receive, through preset transmission resource, the subsequent broadcast information sent by the network device.

18. The terminal according to claim 16, wherein the computer program is executed by the processor to:

in the case that the random access message 2 or the random access message 4 carries at least one of the system information identity information, the identity information of the Other System Information carried by the subsequent broadcast information and the scheduling information of the subsequent broadcast information, receive, through preset transmission resource, the subsequent broadcast information sent by the network device.

19. The terminal according to claim 14, wherein the system information identity information comprises at least one of:

Other System Information identity information, system information block identity information corresponding to the Other System Information, system information block group identity information corresponding to the Other System Information and system information block functionality identity information corresponding to the Other System Information.

20. The terminal according to claim 19, wherein the Other System Information corresponding to the system information identity information is system information carried by the current broadcast information or the subsequent broadcast information.

* * * * *